(12) United States Patent
Jacobs et al.

(10) Patent No.: US 6,732,237 B1
(45) Date of Patent: May 4, 2004

(54) MULTI-TIER CACHING SYSTEM

(75) Inventors: Lawrence Jacobs, Redwood City, CA (US); Alan Demers, Boulder Creek, CA (US); Norman C. Woo, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 527 days.

(21) Appl. No.: 09/650,498

(22) Filed: Aug. 29, 2000

(51) Int. Cl.[7] .............................................. G06F 12/00
(52) U.S. Cl. ...................... 711/119; 711/120; 711/122; 711/129
(58) Field of Search ............................... 711/119, 120, 711/122, 129, 3

(56) References Cited

U.S. PATENT DOCUMENTS

| | | |
|---|---|---|
| 5,822,758 A | 10/1998 | Treynor |
| 5,931,904 A * | 8/1999 | Banga et al. ................ 709/217 |
| 6,507,891 B1 * | 1/2003 | Challenger et al. ......... 711/122 |
| 6,553,411 B1 * | 4/2003 | Dias et al. .................. 709/219 |

\* cited by examiner

*Primary Examiner*—Donald Sparks
*Assistant Examiner*—Bao Quoc Truong
(74) *Attorney, Agent, or Firm*—Park, Vaughan & Fleming LLP

(57) ABSTRACT

A multi-tier caching system is provided for a computing device. The system comprises a first cache implemented in operating system or kernel space (e.g., in memory managed by or allocated to an operating system). The system also comprises a second cache implemented in application or user space (e.g., in memory managed by or allocated to an application program). Also provided is a method of operating the multi-tier caching system to serve one type of data from the first cache and a second type of data from the second cache. The first cache may store frequently requested data items and/or those that require little processing of a data request in order to identify a responsive data item. The first cache may also store data items that can be served in response to data requests having different forms, types, parameters, qualifiers or other indicia. Data that may vary according to the form or content of a data request, and data items that are responsive to data requests that must be fully parsed, examined or processed may be stored in the second cache. A content analysis engine may be configured to determine which of said first cache and said second cache a data item should be stored in. Such determinations may be made by analyzing data requests and/or data items served in response to the requests, guidelines set by a system administrator, and other criteria.

72 Claims, 6 Drawing Sheets

MULTI-TIER CACHING SYSTEM

RELATED APPLICATION

This application is related to U.S. application Ser. No. 09/649,850, filed Aug. 29, 2000, entitled "Performance-Based Caching" and is hereby incorporated by reference.

BACKGROUND

This invention relates to the field of computer systems. More particularly, the invention provides a multi-tiered caching system and a method of operating the system to serve data requests having a range of complexity.

Caching systems are often employed to enable faster responses to data requests, especially where the data being requested is stored on a relatively slow device (e.g., disk, tape). A caching system can generally improve performance by storing all or a portion of the data in a faster device (e.g., random access memory).

In today's computing environments, software-managed caches may be implemented within an operating system or as part of an application program running above the operating system. A cache implemented within the operating system may take advantage of faster access to storage devices, while a cache implemented in an application program usually performs slower due to the processing overhead added by the application coding and the operating system. However, implementing a cache as part of an application program may be easier because one can take advantage of the utilities and protection (e.g., memory management) offered by the operating system. These protections are typically not available to an operating system cache.

Thus, an application program cache may be relatively easy to implement, but have relatively low performance in comparison to an operating system cache, while the operating system cache is more difficult to implement but yields greater performance. Present caching systems tend to implement one or the other of these two types of caches, depending upon a desired level of performance and/or an acceptable amount of design effort.

Further, existing caching systems are most suited for those environments in which the requested data is relatively static and/or is not subject to heavy demand. In particular, existing systems may provide adequate benefits when the cached data need not be updated on a recurring or regular basis. Unfortunately, such systems are ill suited to maintaining desired levels of performance when the requested data is dynamic in nature, particularly when the number or frequency of data requests is high. For example, on the Internet an enormous number of users request dynamic content in the form of news stories, financial data, multimedia presentations, etc., and may do so through customized user interfaces containing dynamic components. In particular, many sites or web pages accessed by users contain data that is updated or replaced on a regular basis.

For high-volume, dynamic environments such as the Internet, existing caching systems are not designed to maintain a steady level of performance. Instead, such environments are generally configured to maintain a consistent level of data quality, typically by attempting to always provide the newest or more recent version of requested data. Thus, when a master copy or version of data that is cached is altered or replaced, the version in the cache must be updated or replaced before the faster cache can once again be used to satisfy users' requests. Until the cache is updated, requests for the data must be satisfied from a slower device (e.g., where the master copy is stored). During heavy periods of traffic or when a large amount of cached data must be replaced, data requests cannot be served from the cache and, unless the web site maintains a sufficient number of alternative, slower, devices to respond to the requests, performance of the web site may decline precipitously.

As a result, a web site operator is faced with a quandary. The operator may employ a sufficient number of slower devices to handle an expected or peak level of traffic, in which case the caching system is superfluous. Or, the operator must be willing to allow performance to be degraded, possibly severely.

Therefore, what is needed is a caching system that can take advantage of the relatively easy development afforded to application program caches and also take advantage of the performance enhancement offered by operating system caches. More particularly, what is needed is a multi-tier caching system that incorporates both types of caches and is flexible enough to store suitable data in each type of cache.

What is also needed is a caching system and a method of operating a caching system in an environment characterized by dynamic data and/or high volumes of data requests, wherein a desired level of performance (e.g., response time to data requests) can be substantially maintained during peak or high traffic periods without obviating the need for the caching system. Also needed is a method of performance-based caching in which data consistency varies as little as possible while promoting a desired level of system performance.

SUMMARY

In one embodiment of the invention a multi-tier caching system is provided in which a first cache is implemented in kernel or operating system space (e.g., as part of the operating system) and a second cache is implemented in user or application program space (e.g., as part of an application program).

In this embodiment the operating system space cache is designed to store and serve relatively simple data in response to fundamental or basic data requests, such as those that require a minimum amount of processing or examination. Data that is responsive to more complex requests may be stored in the application program space cache. Complex requests may require one or more parameters included in the data request to be examined in order to identify the data that should be served in response.

An analysis engine may operate under a set of guidelines or rules to determine what data should be stored in which type of cache, and/or route data requests to one cache or the other. Thus, in one method of operating a multi-tier caching system data requests are routed to an operating system space cache or an application program space cache depending upon the complexity of the data request. In another method, the analysis engine determines which cache a data item should be stored in when it is retrieved or received from a mass storage device or a data server. In determining which cache to use to store a data item, the analysis engine may consider the request that lead to the data retrieval (e.g., how complex the request is, whether the data is responsive to multiple requests), may apply some historical analysis concerning past requests, may apply guidelines or hints specified by a system administrator, etc.

A data item stored in one cache of a multi-tier caching system may migrate to a different cache depending upon its popularity (e.g., how often or frequently it is requested), age, size, invalidity or some other characteristic.

One embodiment of the invention is particularly suited for use in a network environment, such as that of the Internet, in which http (HyperText Transport Protocol) or other requests are received with various headers, qualifiers, parameters or other indicia that must be digested before the appropriate data can be identified and served.

In one alternative embodiment of the invention a system and methods are provided for caching data in a manner that promotes a desired level of performance, as measured by response time for data requests, load placed on a system component, number of open connections, or some other parameter. In this embodiment the consistency of the data provided in response to a request may be allowed to fluctuate, by providing stale versions of the requested data for example, in order to promote the desired level of performance.

In this alternative embodiment, when a request is received at a cache server for data that has been invalidated, the caching system may first determine whether the present or desired performance of the system (e.g., number of open connections, average or incremental response time, throughput, etc.) allows the request to be passed to the data server that stores an updated or current version of the data. The action taken in response to the request may also depend on factors such as the popularity of the requested data (e.g., how frequently or recently it has been requested) and/or its level of invalidity (e.g., how long ago it was invalidated, the severity of invalidation, when the data was last updated or replaced). Different embodiments of the invention may weigh the operative factors differently.

For example, when a request for data that is invalid on the cache server is passed to the data server because the requested data is popular and/or highly invalid, subsequent requests for the same data may be satisfied at the cache server using an invalid version (until new data is received from the data server). Conversely, when less popular and less invalid, but still invalid, data is requested from the cache server, an invalid version of the data may be served by the cache server. In addition, however, a lower priority request for an updated or replacement version of the data may be passed to the data server in order to retrieve the newer data.

In one implementation of this alternative embodiment of the invention the currency or validity of a cached data item may depend upon factors such as: a desired level of system performance (e.g., a target response time to user data requests), one or more characteristics of the data item (e.g., how popular it is, the cost of refreshing it, how valuable the data is), and an allowable rate or number of refreshes that may be performed. Depending upon these factors, a particular data request may be satisfied from a cache memory (e.g., even if the cached data item is invalid) or from a data server or other primary storage device.

DETAILED DESCRIPTION

Figure 1:
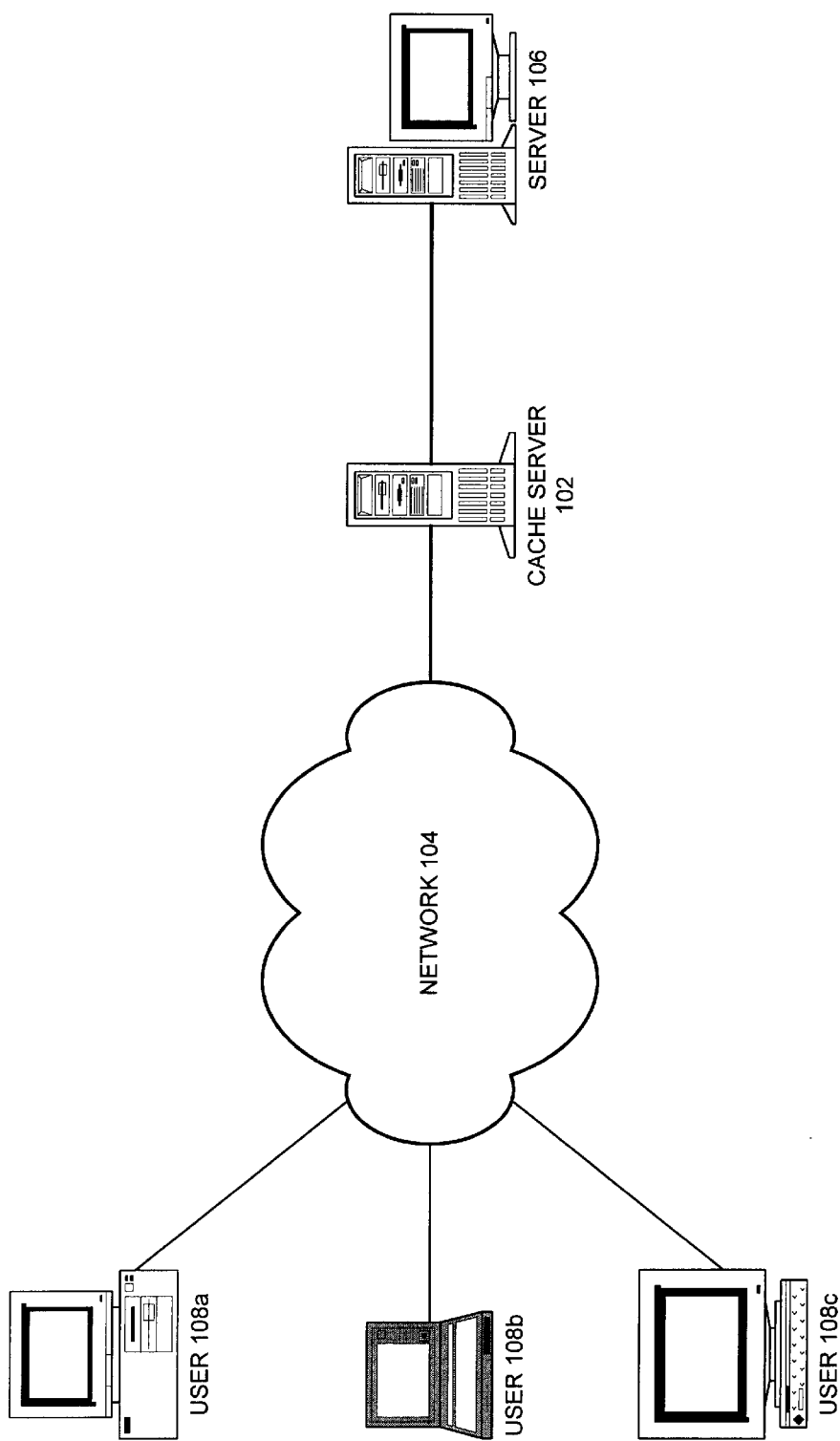
FIG. 1 is a block diagram depicting an electronic environment for caching data in accordance with an embodiment of the invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer or a server designed for a central purpose such as caching data. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

Introduction

In existing caching systems, a cache may be interposed between data requesters and one or more devices (e.g., data servers, disk drives, tape drives) configured to respond to data requests with a relative slow response time or throughput. The cache is intended to store data from the slower device(s) and respond to users' requests with greater speed. However, in an environment in which the data is relatively dynamic, the cache may require data updates or replacements in order to keep it populated with the most current data. Once a data item on the cache is invalidated or otherwise becomes obsolete in a present caching system, and until the data is finally refreshed, requests for the data must be passed through to a relatively slow device, thus degrading response time and/or throughput. Such a caching system thus promotes data consistency, but at the expense of performance. In many of today's electronic environments a high and/or sustainable level of performance is required, thereby making this type of system unsuitable.

Thus, in one embodiment of the invention a method is provided for operating a caching system in a manner that promotes a desired level of performance, which may be measured by response time, level of traffic, request throughput, number of open requests, or some other criterion or factor. The consistency of the data served in response to a data request may be allowed to vary in order to substantially maintain the desired performance. More specifically, depending on the desired and present performance of the system and the possible effect of whatever action is taken to satisfy the request, the request may be held to await new or updated data, may be passed to a relatively slow device (e.g., where the new/updated data is available), or may be served with older (e.g., invalid) data. Various performance indicators (e.g., response time, traffic level, processing power) may be considered in determining what action to take.

Characteristics or factors of the requested data may also be considered in determining whether to pass a request to the slower device or respond with an invalid version of the data. In particular, the popularity and/or level of invalidity of the data may be considered. The popularity of a data item may be reflected in factors such as the number of times (or the frequency with which) the data has been accessed or requested, how long ago it was cached, when it was last accessed or requested, etc. The level of invalidity may comprise a measure of how long ago it was last updated (e.g., the age of the data), how frequently or the number of times the data was invalidated, how long ago it was last invalidated, the severity or level of the invalidity (e.g., how much of the data is stale or obsolete), etc.

Software-managed caches implemented as part of an operating system (e.g., in kernel space) tend to provide greater performance (e.g., measured by response time) than caches implemented with an application program (e.g., in user or application space). However, a developer of an operating system cache cannot take advantage of the memory management protections and other utilities offered by the operating system to application programs, thus making the operating system cache more complex and difficult to develop.

Thus, in another embodiment of the invention a multi-tier system is provided that yields the benefits of both types of caches by implementing an inter-connected series of at least one cache in kernel space and one cache in user or application space. Depending upon the complexity of a user's data request and the amount of data to be served in response to the request, it is satisfied from one or the other of the caches.

One or more embodiments of the invention are particularly suited for use in a network environment, such as the Internet, where requested data is dynamic and/or a high volume of requests may be received. For example, a web site serving content that is regularly updated or replaced may implement this embodiment in order to maintain a target level of performance even during periods of peak requests or when a large amount of cached data must be replaced or updated.

Although embodiments of the invention are discussed in the context of a widely accessible network such as the Internet and the serving of dynamic content in response to http requests or other forms of data requests, the invention is not limited to the scope of such embodiments. Other embodiments of the invention may be implemented virtually anywhere a desired level of caching performance is required, such as in a file system, database, etc., regardless of the type of data that is cached or how dynamic it is.

Performance-Based Caching of Dynamic Data

FIG. 1 illustrates an environment in which a caching system according to one embodiment of the invention may be implemented. In FIG. 1, cache server 102 is interposed between network 104 and one or more servers (e.g., web servers, content servers, data servers), such as server 106. Users 108a, 108b, 108c are coupled to network 104, through which they submit requests for content generated by and/or stored on server 106. In this embodiment data served by server 106 may include textual, numerical, multi-media or other types and forms of information suitable for transmission to a user through network 104 and may adhere to any of a variety of protocols or formats (e.g., HTTP, FTP, HTML, XML).

Although cache server 102 is separate and distinct from server 106 in the illustrated embodiment, in another embodiment of the invention one may comprise or be co-located with the other. Also, the medium(s) through which data requests are received and/or satisfied are not limited; thus, the system may include direct or indirect communication links using wired and/or wireless technologies.

In one implementation of this embodiment, cache server 102 and server 106 are operated on behalf of an Internet worldwide web site. In this implementation one or more of users 108a, 108b, 108c desire access to information served by server 106 and may employ a browser or any other suitable user interface to submit appropriate requests for the information.

In FIG. 1, some subset of data generated or stored on server 106 is copied to cache server 102, from where it can be expeditiously served in response to user requests. Thus, during operation of the system, cache server 102 will often respond to user requests with data stored in a local cache, without involving server 106, but may resort to the content server for new or altered information. During a normal mode of operation (e.g., when data cached on cache server 102 is up to date with corresponding data on server 106), the request is served by the cache server. Depending on whether and how it affects system performance, and possibly other factors (e.g., cost of refreshing a data item, allowed refresh rate, popularity or value of a data item), a request may be sent to server 106 when the cache data is out of date (e.g., obsolete, stale, invalid).

Any particular data item or other information on cache server 102 may be considered (and/or marked) valid or invalid. A data item may be considered valid if the data item on server 106 from which it was copied has not been changed, updated or replaced. It may be considered invalid if the original data on server 106 has been changed or replaced. Illustratively, when data is changed or replaced on server 106, a communication may be sent to the cache server to invalidate the corresponding data item(s). Thus, when the cache server receives and caches new data from the server, it may continue serving it in response to user requests until informed that the data is invalid or should be removed or replaced.

When cache server 102 receives a request for which it has no matching data, either valid or invalid, the request may be passed to server 106. And, when the requested data is sent back from the server, cache server 102 may store it locally (and mark it valid) and forward it to the requesting user.

An operator or administrator of cache server 102 may specify one or more performance characteristics, criteria or indicators to identify a target level of performance for the system. The operator may, for example, specify that 95% of user requests should be served within two seconds, meaning that for no more than 5% of user requests should it take longer than two seconds to serve a response. As another example, the operator may specify that server 106 should not be burdened with more than one hundred requests at a time (e.g., data requests, refresh requests), or that the server should not be burdened with requests to produce pages of content at a rate greater than one hundred pages per second. In different implementations of this embodiment, virtually any criterion that is measurable or that can be applied by cache server 102 may be used to determine a desired or target level of performance. Yet further, cache server 102 may anticipate receipt of a data request by refreshing a data item (e.g., an invalid item) before a request is actually received.

When cache server 102 receives a request for data that has been marked invalid, the cache server may satisfy the request with the invalidated (e.g., stale) data, pass it to server 106 or, in one alternative embodiment, suspend the request to await valid data. In determining how to handle the request, cache server 102 may consider operating conditions of the system such as the amount of traffic, number or frequency of data requests, number or frequency of requests for the invalid data, load level of server 106, response time of a request passed to server 106, allowed rate for submitting data refreshes or requests to server 106, etc. The current conditions may be compared to a specified indicator of a desired level of performance, such as: throughput (by cache server 102 and/or server 106), response time, maximum or average load desired for a server, etc.

The decision to send a request to server 106, or the priority or urgency with which the request is sent may also depend on a characteristic of the data, such as its popularity, age, size, type, value, cost to refresh the data, etc. The decision as to whether to pass the request to the data server, and/or the priority with which the request is forwarded, may also depend on how invalid the data is (e.g., how much of the data has changed, how severe the changes are, how long ago the data was deemed invalid, when it was last updated). Thus, if the current operating conditions allow, including the performance of server 106, and/or a characteristic of the data warrants, a request for invalidated data may be passed to server 106, particularly if it is a first or early request for the data after its invalidation. As described previously, when server 106 returns the requested data, cache server 102 will forward it to the requesting user(s) and also cache it for use in serving other requests. Illustratively, any other requests for the invalidated data that are received after one is passed to server 106 may be held until the requested data is received from the server. If, however, any of the suspended requests are held too long (e.g., to the point that a desired performance level may be threatened), then cache server 102 may satisfy one or more of the waiting requests with the old (i.e., invalidated) data.

Requests passed to the data server for satisfaction may be assigned a level of priority consistent with the popularity, age, invalidity or other characteristic of the requested data. The priority of a request may, however, be dynamically altered.

If an operating condition at the time of a first request for invalidated data is such that the request cannot be sent to server 106 without having a detrimental effect on the system performance, or the requested data is not popular or invalid enough to warrant priority service, then a previous or older version of the requested data (e.g., data that was invalidated) is returned to the requesting user.

Although the most recent data is not provided, a desired level of system performance can thereby be maintained. And, because the amount of time needed to receive updated data from server 106 will typically be rather short, it should only be on rare occasions that many users are served stale data. In particular, it may be possible that stale data is only, or primarily, served when traffic levels are very high and/or a large amount of cached data has been invalidated.

Figure 2:
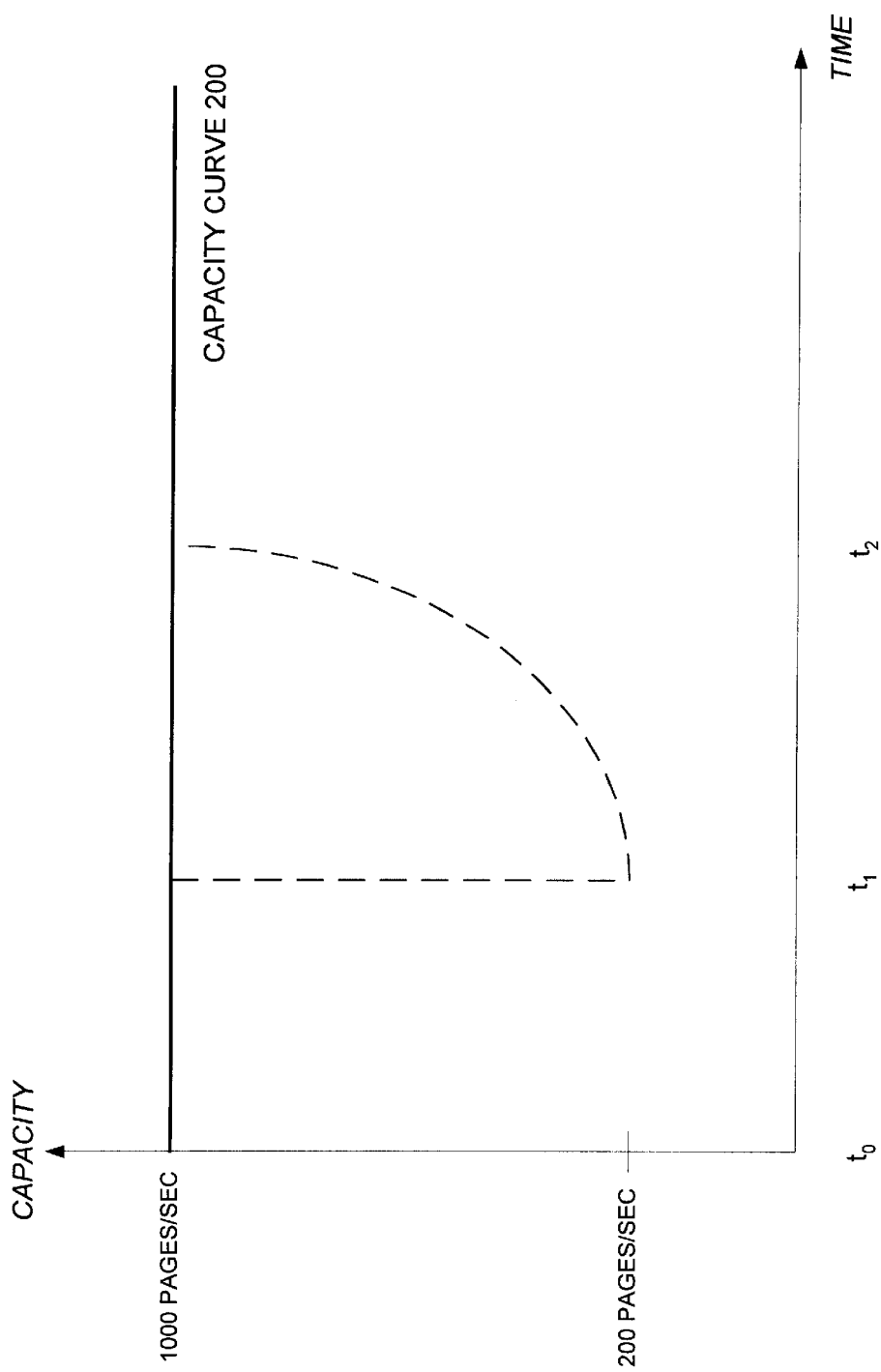
FIG. 2 is a graph depicting the maintenance of a steady level of performance capacity in accordance with an embodiment of the invention.

FIG. 2 depicts an illustrative capacity curve for serving data in the system of FIG. 1 according to one embodiment of the invention. In this illustrative embodiment cache server 102 is capable of serving cached content at a rate of up to 1000 pages per second while, without the cache server, server 106 is capable of serving up to 200 pages of content per second.

Curve 200 of FIG. 2 depicts three relevant time periods. From time $t_0$ to $t_1$, valid copies or versions of data requested by users are stored on cache server 102 and are used to service the requests. At time $t_1$ the data is invalidated and the cache server is not updated until time $t_2$. After time $t_2$, user requests are satisfied with the new cache data.

Between time $t_1$ and $t_2$, previous caching systems may experience a severe reduction in capacity, indicated by the dashed line, as requests for the invalidated data are passed to server 106 and are served at a maximum rate of 200 pages per second. In accordance with a present embodiment of the invention, however, in order to promote desired performance the invalidated data may be served to some or all requesting users during the time $t_1$ to $t_2$. At least one request, however, may be passed through to server 106 in order to retrieve the new or updated data.

In one alternative embodiment of the invention, when cached data is invalidated at time $t_1$, the cache server may initiate a request for replacement data or server 106 may forward the replacement data on its own accord. In this alternative embodiment all users requesting the data may receive the invalidated data until the replacement data is cached. Thus, in this alternative embodiment cache server 102 is updated without waiting for a user request for data that has been invalidated.

The illustrated embodiment of the invention may thus fully or partially eliminate the "trough" of curve 200 that was experienced in previous caching systems. Although system performance may be a primary goal in one implementation of this embodiment, the consistency of the data served is not ignored. In particular, in this embodiment the replacement data may be served in response to user requests as soon as it is cached on cache server 102. This differs from other caching systems that may serve stale data for a pre-determined period of time, in which case data inconsistency needlessly suffers.

Cache server 102 may, in order to promote a desired level of performance, monitor the response rate to user requests, the load on server 106, the number of open connections, one or more characteristics of a cached data item, and any other parameters. The parameters to be monitored in order to determine when or whether to respond to a request with stale data may be specified by a system administrator or operator and/or cache server 102 may apply a learning algorithm to determine what conditions reflect and/or what actions cause decreased performance. Then, when these conditions or actions are encountered, the cache server may serve stale data to avert the loss of performance.

Figure 3:
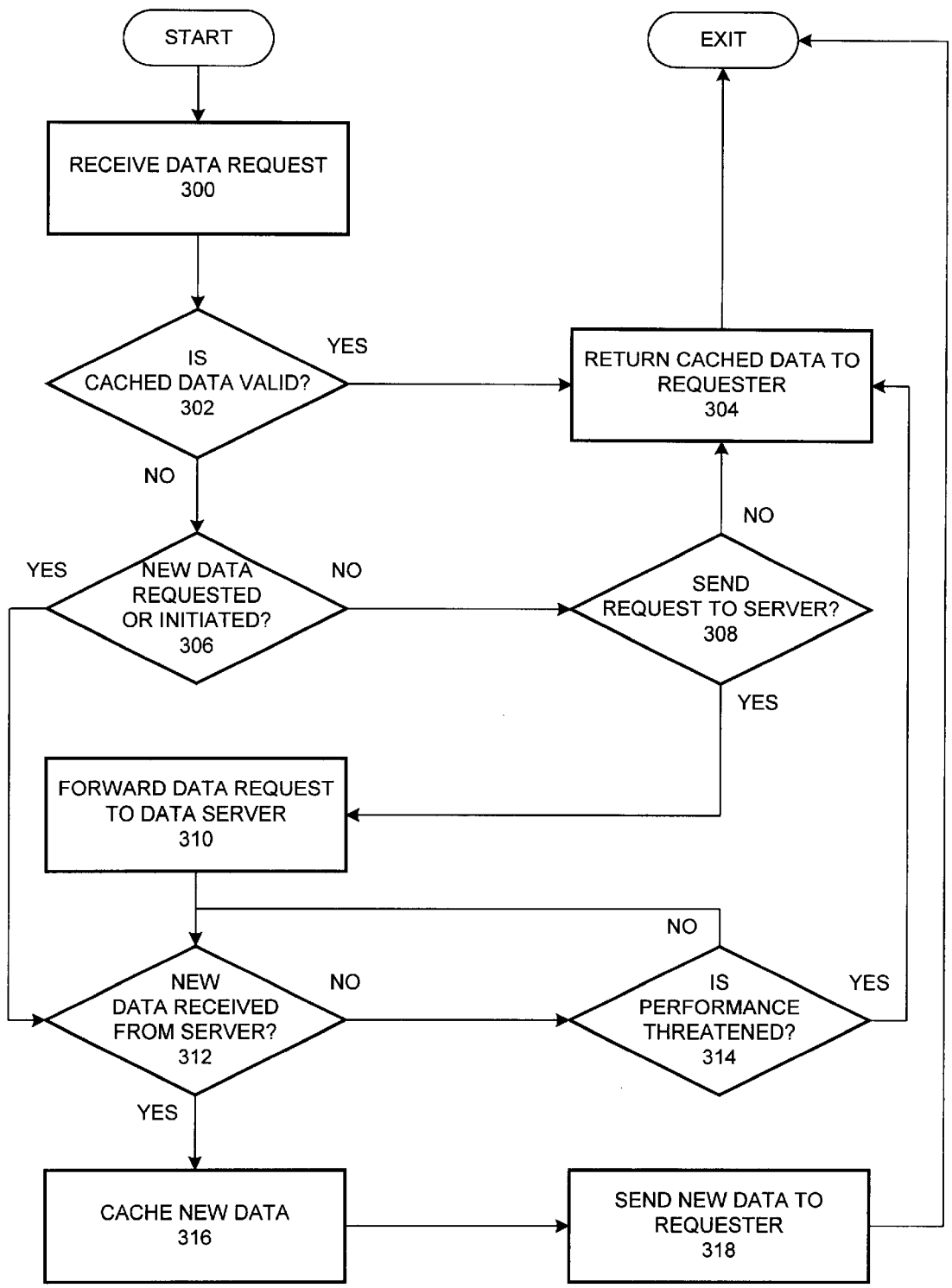
FIG. 3 is a flowchart depicting the operation of a caching system in accordance with an embodiment of the invention.

FIG. 3 demonstrates one method of operating a caching system to substantially maintain a desired level of performance according to a present embodiment of the invention. The illustrated method may be implemented in an electronic environment in which cached data may become obsolete or stale because the data that had been copied into the cache (e.g., from a data server) is updated or replaced. The data that is cached may be of virtually any form and size. Further, and as described in a later section, the cache server may implement multiple caches for handling different types of data requests.

FIG. 3 also inherently describes a method of refreshing or updating a cached data item. As discussed above, a cached data item may be refreshed as part of satisfying a current or pending data request, or may be refreshed prospectively, in anticipation of a future data request.

In state 300 of the illustrated procedure, a request for data that is or was stored on a data server and that is or will be cached on a cache server is received at the cache server. The cache server has one or more cache memories. In a cache memory is stored either the requested data or data that is responsive to the request but which has been invalidated (e.g., made obsolete or stale). The cached data may be invalid because a version of the data that is stored on the data server, and which is particularly responsive to the request, has replaced or updated the now-invalid data.

In state 302 the cache server determines whether the cached data that is responsive to the request is valid. Illustratively, when cache data becomes invalid the cache server marks it as such (e.g., when directed by the data server). In one implementation of this embodiment of the invention, the cache server may refresh an invalidated data item, if operating conditions permit, before the next request for the data item. If the cached data is valid, then in state 304 that data is returned to the requester and the procedure ends.

If, however, the cached data is invalid, then in state 306 the cache server determines whether responsive data has been requested from or offered by the data server. Such data may have already been solicited from the data server by previously passing it a user request for the same data. Or, when the cached data was invalidated, the cache server may have automatically requested replacement or updated data, or the data server may have indicated that it will forward the new data. If replacement data has been solicited or initiated, the illustrated procedure advances to state 312 to wait for it; otherwise the procedure continues at state 308. In one alternative embodiment of the invention, after replacement/ updated data is requested or initiated, subsequent requests (until the replacement/updated data is received) may be satisfied using an invalid version of the data.

In state 308 the cache server determines whether to forward the present request for the data to the data server. The cache server may decide to forward the request if, for example, it determines that the data server can handle or service the request without decreasing or threatening to decrease the system performance below a desired level. Thus, if a performance goal is to serve 95% of user requests within two seconds, the cache server may determine whether those guidelines are in danger of being violated if the request is forwarded. In determining whether the desired performance is threatened, the cache server may consider the number of requests currently pending on the data server, a rate at which requests are being or have been received, how much of its cache contents are invalid (and need to be updated/replaced), and/or other factors.

Thus, if the cache server deems that the current burden on the data server is too great to'service the request in a timely manner, the request may not be forwarded, even if the present request is the first chance to request the new data. However, in one implementation of this embodiment, where the new or updated data has not yet been requested or initiated there may be a prejudice toward forwarding the request to the data server, particularly if it is the first request (or an early request) received after the responsive cache data is invalidated.

Other factors that may be considered in determining whether to forward the request to the data server include factors concerning the requested data item, such as how old it is, how long ago it was invalidated, how much of the data item is obsolete/stale or how important the changes to the data item are, how often or frequently the data item has been requested or accessed, when it was last accessed, its size, the cost of replacing or updating the data item, etc.

Therefore, in one particular embodiment of the invention, any or all of several factors may determine when (or how often) a data item is refreshed and/or when a data request is passed to a data server rather than being served with invalid data. One factor is a desired or target system performance, such as a desired response time to user data requests. Another factor is an allowed rate at which data requests and/or refresh requests may be submitted to the data server. Yet another factor focuses upon one or more characteristics of the data item (e.g., popularity, invalidity, age, size, cost of refreshing, value).

If it is decided to forward the request to the data server, the illustrated procedure continues at state 310. Otherwise, the procedure continues at state 304 and returns invalid cached data in response to the request. This situation, wherein a cache entry is invalidated and a first or early request for the new/updated data is not passed forward to retrieve the data from the server, may only occur in rare circumstances—such as when many entries have been invalidated and/or a large number of user requests for the invalidated entry/entries are received. In such a circumstance, because a steady level of performance is desired, it may be preferable to return stale data rather than allow performance to suffer. Also, in this circumstance requests for some invalidated data will still be forwarded to the data server, to the extent that performance considerations allow, even though the present request was not. As invalidated cache entries are replaced or updated, eventually (and likely within a relatively short period of time) data responsive to the present request will be retrieved from the data server (e.g., when a later request for the data is received and forwarded) and cached.

In state 310 the data request is forwarded to the data server. The cache server may track the request in order to measure the response time or some other performance measure of the data server. This information may be useful in determining whether a different request can be forwarded to the data server without endangering the desired performance.

In state 312 the cache server awaits the new or updated data from the data server. When it is received, the procedure advances to state 316. The cache server may monitor, collect or generate performance statistics while waiting for the new data. Additionally, in one embodiment of the invention the cache server may respond to requests for the same data that are received while waiting for the new or updated data by serving an invalid version of the data.

Until the requested data is received the illustrated procedure may visit state 314 to determine whether the request should be acted on even without the new data being available. For example, where the desired performance level may be indicated by the time needed to respond to a user request, the cache server may monitor the amount of time a request is pending. If a performance goal is threatened by the duration of the wait, the cache server may jump to state 304 and return stale or invalid data to the requester. The procedure would then exit after state 304. As long as the performance goals/criteria allow, however, the illustrated procedure may cycle through states 312 and 314 to wait for the new data to satisfy the present request.

When the new or updated data is received from the data server, in state 316 it is stored in a cache memory of the cache server. It may or may not overwrite the invalidated data. In state 318 the new data is returned to the requester, after which the illustrated procedure ends.

FIG. 3 illustrates just one method of responding to data requests in a caching system. Other methods of responding to data requests while striving to maintain a desired level of performance may be derived from the illustrated method without exceeding the scope of the invention.

In one particular embodiment of the invention requests for invalid data that are received at a cache server may be segregated according to the popularity, level of invalidity and/or some other characteristic of the invalid data. An initial request for a first type of invalid data—such as a data item that is popular and highly invalid (e.g., as measured by how long ago the data became invalid, the severity of invalidity, how frequently the data server has marked the data item as invalid, the confidence level in a communication ordering the invalidity of the data)—may be assigned a high priority and passed through to the data server for satisfaction. Illustratively, subsequent requests for the same data item are satisfied by the cache server, using an invalid version of the requested data, until replacement or updated data is received from the data server in response to the initial request.

A request for another type of invalid data—such as a data item that is less popular than the first type—may be served by the cache server with an invalid version of the requested data. In addition, though, a lower priority request for the less popular data may be forwarded to the data server. Any method of prioritizing and serving requests may be applied by the data server but, illustratively, in this embodiment all requests having a higher level of priority may need to be served before a request at a lower level of priority is served. The priority of a request may be dynamically modifiable. Subsequent requests for this less-popular data are served with an invalid version of the data until an updated or new version of the data is received by the cache server from the data server.

Multi-Tier Caching

Figure 4:
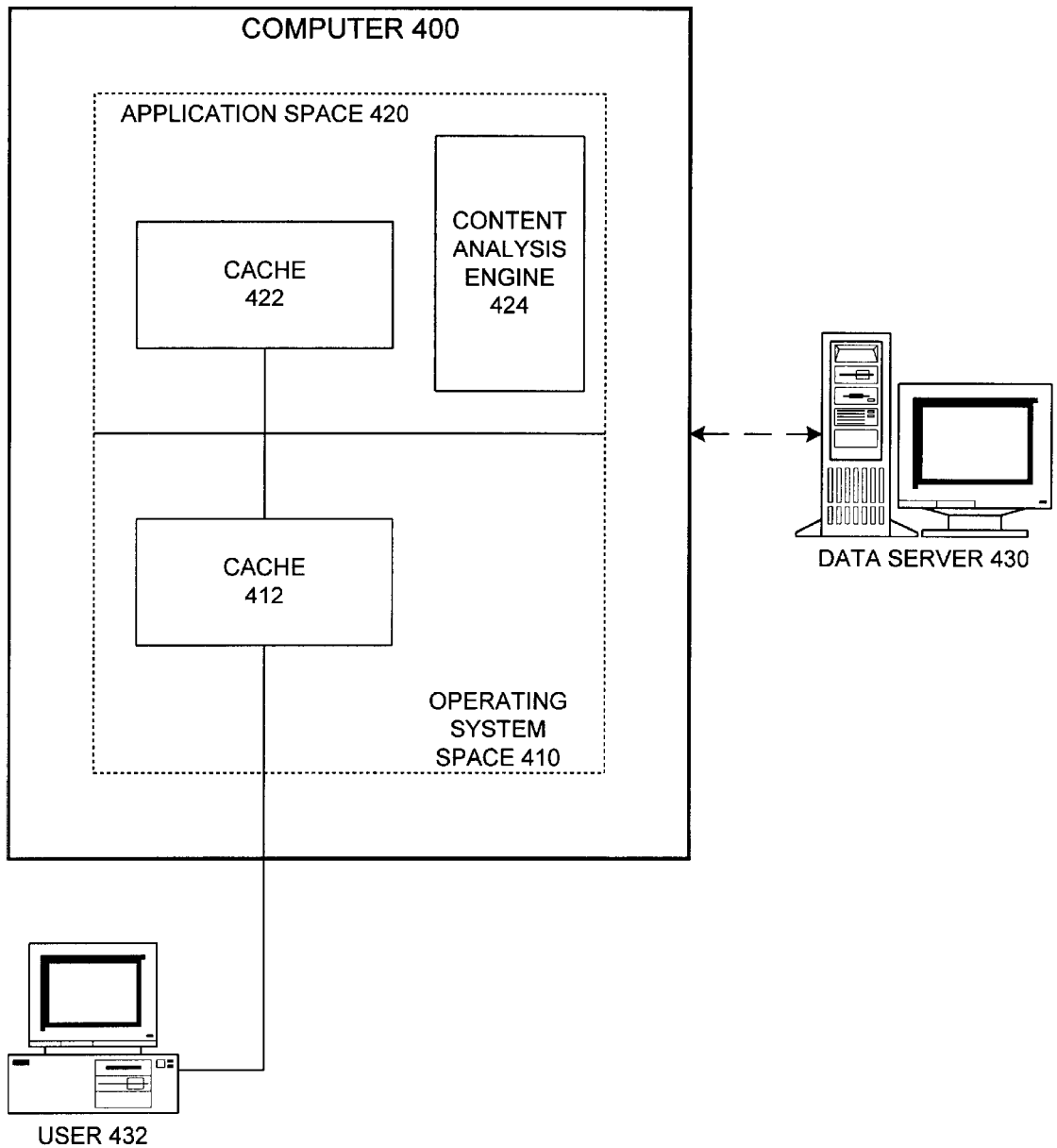
FIG. 4 is a block diagram depicting a multi-tier system of caches according to an embodiment of the invention.

FIG. 4 depicts a computer system configured with a multi-tier cache system in accordance with one embodiment of the invention. Computer 400 may, for example, be a cache server in a network environment similar to that depicted in FIG. 1. The scope of the present invention, however, is not limited to the specific embodiments depicted in FIG. 4 and described in this section.

In FIG. 4, computer 400 is a server that receives data requests from users (e.g., user 432), where the requests may take various forms and have a range of complexities, thus requiring varying degrees of analysis in order to process. One implementation of computer 400 may be tailored for an environment such as the Internet and the world-wide web, in which case computer 400 receives http (HyperText Transport Protocol) requests. Computer 400 may also, in this or alternative implementations, receive requests formatted according to other communication protocols, such as ftp (File Transfer Protocol), NFS (Network File System), etc.

Computer 400 includes operating system (or kernel) space 410 and application program space 420, which may also be considered user space. Operating system space 410 may include a portion of the main memory (e.g., RAM) of computer 400 that is allocated to the operating system or one or more components or modules of the operating system. Application program space 420 may be an area of memory (e.g., virtual memory) that is allocated to an application or user program or a module of such a program.

In this embodiment, operating system space 410 is where the operating system of computer 400 executes, and is characterized by low-level operations in which operating system modules or components may directly, or nearly directly, manipulate hardware elements of the computer (e.g., random access memory, disk drive, input/output port). By contrast, application space 420 is where application or user programs execute. These programs perform input/output and initiate hardware operations by invoking utilities, drivers or procedures provided by the operating system. As a result, cache 412 within operating system space 410, is able to access computer memory faster and more efficiently (e.g., through direct reads to physical memory) than cache 422 of application space 420.

In FIG. 4, cache 412 stores one set of data or data items that may be served in response to data requests, while cache 422 stores another set of data or data items.

Content analysis engine 424 operates in application program space 420 in the illustrated embodiment. In other embodiments an analysis engine may be located in operating system space or be divided between the two. Illustratively, content analysis engine 424 analyzes data and/or other content as it is received (e.g., from a mass storage device or data server 430) for caching on computer 400. The analysis engine may examine the correlation between the data and the request that led to retrieval of the data to determine, for example, if the data is responsive to only that request or to multiple requests (e.g., different types or forms of requests, or requests having different parameters or header values), to determine how much processing or examination the request required in order to identify the data, etc. In short, content analysis engine 424 is configured to determine whether data to be cached should be stored in operating system space cache 412 or application program space cache 422. As described below, various criteria concerning data requests and data may be considered in choosing which cache a data item should be stored in.

In the embodiment of FIG. 4, when a data request is received at computer 400 from user 432, cache 412 examines the request to determine if it can or should respond to the request. If not, the request is passed to cache 422 for satisfaction. If cache 422 does not have the requested information, then the request may be passed to another entity that stores the requested data. In FIG. 4, the request may be passed to another computing device, such as data server 430. In alternative embodiments of the invention the request may be passed to a storage device such as a disk drive, tape drive, etc.

Cache 412 and/or cache 422 may make decisions on whether to process a particular data request based on guidelines from content analysis engine 424, a system administrator, or other source. Thus, when content analysis engine 424 determines that a particular data item should be stored in cache 412, cache 412 may be configured to serve the data item in response to requests of a certain type or format.

Caches 412, 422 of FIG. 4 are considered to include the necessary computer-executable instructions for managing as well as implementing the caches. In alternative embodiments of the invention, however, separate cache management modules may reside in operating system space 410 and application program space 420, respectively, for cache 412 and cache 422.

Illustratively, the data or data items stored in caches 412, 422 of computer 400 are copied or originate from another storage device or system, such as data server 430. Thus, in FIG. 4, data requested by user 432 can be found on data server 430, but the response time of the server (i.e., the time required to pass a request to the data server and return the desired data) is typically much greater than the response time of computer 400 when the requested data is cached. In an alternative embodiment of the invention the final, ultimate or master version of data may on a mass storage device (e.g., disk, tape) coupled to computer 400.

Because computer 400 may receive data requests having a range of forms and complexities, in one embodiment of the invention data that is responsive to relatively simple data requests may be stored in cache 412, while data responsive to more complex requests may be stored in cache 422. Determining whether a data item is responsive to simple or complex requests may require some historical analysis, operating guidelines or hints (e.g., specified by a system administrator), etc. If, for example, the data to be served in response to an http request depends on a header value (e.g., which specifies a user's language or geographic location), such data may be stored in cache 422 vice cache 412. Conversely, data that does not depend on qualifiers, headers, parameters or other indicia included with a request, or data that is the same for multiple qualifiers or other indicia, may be stored in cache 412.

Because relatively complex data requests are handled by cache 422, cache 412 may be kept relatively simple—with just enough "intelligence" to handle the types of requests and data specified by a system administrator or developer. In particular, because complex requests are examined by cache 422, cache 412 can be designed or instructed to handle only specific types or forms of requests that can be recognized and handled quickly (e.g., an http request that can be satisfied just by identifying a URL (Uniform Resource Locator)). In this case complex requests are handled in application space 420, where cache 422 can take full advantage of memory management, invalidation, a larger (virtual) memory pool and other utilities and functions provided by the operating system.

An http request may include headers that specify the issuing user's browser, character set, graphical capability, security profile, ability to handle compressed data, etc. Such a request should be handled in application program space 420 in the illustrated embodiment, rather than slowing the performance of cache 412 in operating system space 410. Another reason that such a request should be handled in application program space .420 in this embodiment is that several variations of data items may need to be cached in order to be responsive to the various permutations of the request's header values. Advantageously, cache 422 is larger in size than cache 412 because cache 422 can use virtual rather than physical memory and is easier to manage; these benefits help make up for its relatively slower performance. Thus, cache 422 is better suited than cache 412 for holding data for similar requests and for responding to complex or variable requests.

Other factors that may be considered when determining whether a data item should be stored in cache 412 or cache 422 are the popularity of the item, its (relative) validity or invalidity, the size of the item, the type of data it comprises, etc. Frequently requested data items (e.g., a logo displayed on multiple pages of a web site, prices for popular items in an on line catalog or price list) may be stored in cache 412, particularly if rather small in size. Less popular data items may be stored in cache 422. Measuring the popularity of a data item may involve considering characteristics such as the number of times the data item has been accessed, when it was last accessed, how long ago it was cached, etc. The validity of a data item may be measured by considering characteristics such as when it was last updated, a TTL parameter, whether and how often the item has been marked invalid (e.g., by data server 430), how long ago it was last invalidated, the confidence in a message that purports to invalidate the item, the severity of invalidity (e.g., how much of the data item is invalid), etc. In one embodiment of the invention a data item may migrate from one cache to another. Such migration may be due, in part, to factors such as the data item's popularity size, validity/invalidity, etc.

Another factor that may be considered in determining whether a selected data item should be placed in cache 412 or cache 422 is whether the data item is relatively dynamic or static. If relatively static (i.e., it is replaced or updated less frequently than other items), a data item may be more likely to be stored in cache 412. Data items that change regularly (e.g., new or breaking news stories) may be more likely to be stored in cache 422. Thus, in various embodiments of the invention, any combination of these factors and/or others not specifically enumerated here may be used to determine whether a particular data should be stored in cache 412 or cache 422. These determinations may be made by content analysis engine 424 in the embodiment of FIG. 4.

In another embodiment of the invention, however, a system administrator may provide hints concerning how a request should be processed and/or what data items or types of data items are suitable for storage in one or the other of caches 412, 422. These hints may replace or supplement the operation of content analysis engine 424. For example, the administrator may specify that data requests having a specified form may need to be served in a number of different languages depending on a particular value provided with the requests. The multi-tier caching system then directs such requests to an application program space cache, and the data retrieved in response to the requests will be stored in the application program space cache rather than an operating system space cache. Conversely, if the administrator specifies that for certain data requests or types of requests the same data item will be served regardless of information embedded in the header, then the responsive data item may be stored in an operating system space cache.

In one alternative embodiment of the invention the caching system may analyze requests over time, correlate them with the data served in response, and make its own determinations as to whether a particular data item is responsive to multiple individual or types of requests.

An administrator guideline may, in one embodiment of the invention, identify a portion of a web site and specify information that the caching system should use to determine the data to serve in response to a user request in the identified portion. Where, for example, web site components are arranged hierarchically (e.g., in a tree structure), an identifiable region of the site may encompass a number of pages. The administrator may specify, for different regions, what type of information is needed in order to determine the correct data to serve. The necessary information may be a user's geographical location in order to determine what prices to show a user, may be a user's browser or graphical capability in order to determine what visual components can be include in a served page, etc. As described above, a particular user's value for the varying criterion may be specified as part of the data request. Alternatively, it may be stored as a cookie on the user's computer system and be retrieved by computer 400, data server 430 or some other element of the computing environment. For example, cache 422 may elicit the cookie from the user when the user's data request is received.

In the illustrated embodiment of the invention the rules or guidelines that determine whether a data item is stored in cache 412 or cache 422 are dynamic. They may therefore be updated or replaced in order to alter the operation of the multi-tier caching system.

In another alternative embodiment of the invention the cache in which a data item is stored may depend on information embedded in the data item. For example, in version 1.1 of the http standard a web page may include a VARY header, in which case the content of the page varies depending on the specified criterion (e.g., language, browser, geographic location). In this alternative embodiment it may be more efficient to store such data items in cache 422 than cache 412.

Operating system space cache 412 may be configured to hold less data than application space cache 422, but, depending on the distribution of data requests, may still hold data that is responsive to a large percentage of data requests received at computer 400. For example, even where cache 412 is but a fraction of the size of cache 422, if historical information concerning data requests (e.g., including the data served in response to the requests) is captured and applied to determine the most popular items, cache 412 may be able to respond to a majority of the data requests.

Computer 400 may communicate with another computer system, such as data server 430, in order to determine whether/when data stored in cache 412 and/or cache 422 is invalid (e.g., stale, obsolete). Alternatively, the data server may automatically inform computer 400 when data that has been cached is invalid.

Cache 412 may be implemented as a module that is loadable into the operating system. In a Unix-based operating system, for example, cache 412 may be implemented using a STREAMS module. Or, as one alternative, cache 412 may be built into the operating system.

Although the multi-tier caching system of FIG. 4 depicts only two caches, in alternative embodiments of the invention additional tiers may be implemented. For example, a lower tier may be implemented in a hardware device (e.g., as part of network interface circuit or input/output port). As another example, a cache may be interposed between caches 412, 422 by implementing multiple caches in either operating system space 410 or application program space 420. Yet further, caches in a multi-tier caching system according to an embodiment of the invention may be implemented in, or associated with, different layers of a protocol stack.

Figure 5A:
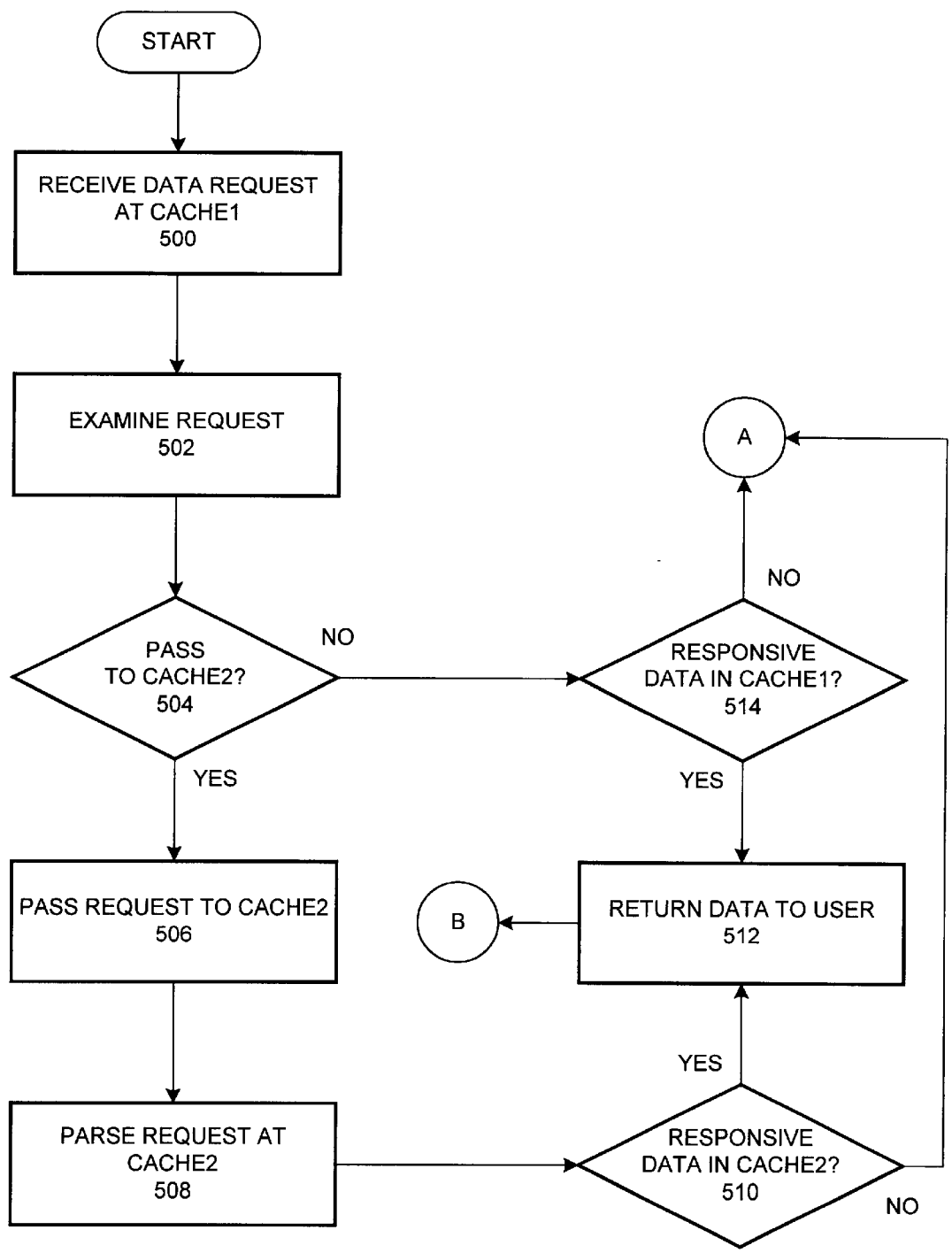
FIGS. 5A–B depict a procedure for receiving and responding to a data request in a multi-tier caching system according to one embodiment of the invention
Figure 5B:
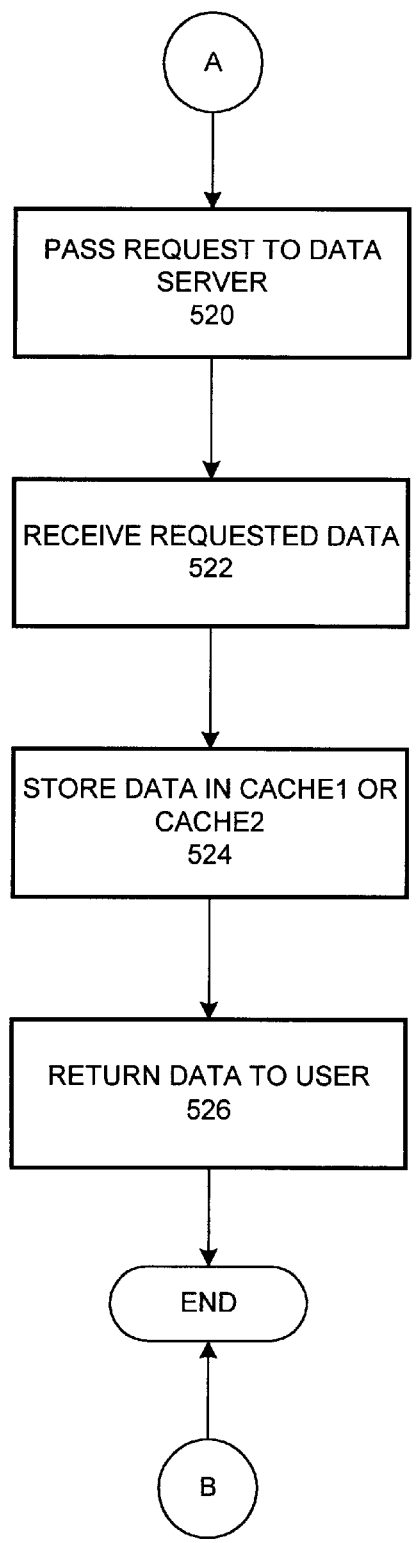

FIGS. 5A–B depict one procedure for receiving and responding to a data request in a multi-tier caching system according to one embodiment of the invention. In this embodiment, operating guidelines are specified for a first cache (e.g., cache1) implemented within (or as a loadable module to) an operating system and a second cache (e.g., cache2) implemented as part of, or in association with, an application or user program. Illustratively, the guidelines are used to determine whether a data request should be handled by cache1 or cache2, depending on the most likely location of the requested data. For example, the guidelines may identify or specify request formats or types for which responsive data is or is not likely to be stored in cache1.

Cache1, or the contents of Cache1, may be considered to be managed by the operating system, in that its contents are inserted and removed by (or under the direction of) the operating system. Cache2, or the contents of Cache2, may be considered to be managed by the application or user program.

In state 500, a data request is received at cache1 from a user. Illustratively, the request is for content to be served in a web-based environment such as the Internet or an intranet.

In state 502 cache1 (or a management module corresponding to cache1) examines the request. Cache1 may, for example, identify the type of request and/or retrieve one or more headers or other components of the request.

In state 504 cache1 determines whether to pass the request to cache2 or attempt to satisfy it. In particular, and as described above, in the illustrated embodiment of the invention guidelines are provided to allow a cache to determine whether a given data request should be handled by cache1 or by cache2. In particular, cache1 may apply the guidelines discussed above to characterize the request or otherwise determine whether the requested data is likely to reside in cache1. The guidelines may, for example, state that all ftp requests are to be passed to cache2 (or directly to another device, such as a data server), or that all requests for a specific URL (possibly without regard for any request headers) are to be served with a particular data item stored in cache1. Thus, merely identifying the type of request or a basic component of the request may allow cache1 to determine how to handle it.

In this embodiment clear rules are provided to allow for expeditious and exact routing of requests. In one alternative embodiment, however, cache1 may simply attempt to satisfy a received request and, if it does not have the requested data, then pass the request to cache2. This alternative embodiment may be particularly suited for use with relatively small operating system caches that can be searched in less time than may be needed to apply a set of guidelines to determine where the request should be handled.

In state 504, if the guidelines indicate that the request is relatively complex (thus requiring additional parsing or analysis) or that the data needed to respond to the request may depend on one or more parameters of the request, cache1 will pass the request to cache2 in state 506. Otherwise, the illustrated procedure advances to state 514.

After the request is passed to cache2 in state 506, in state 508 cache2 parses or further analyzes the request (e.g., to retrieve all headers or other differentiating information) to determine or identify the data that should be served in response to the request.

In state 510 cache2 determines if it contains the data that should be served. If so, the data is served in state 512 and the procedure exits. Otherwise, the procedure continues at state 520.

In state 514, cache1 determines whether it stores the data that should be served in response to the request. If so, the data is served in state 512 and the procedure exits. Otherwise, the procedure continues at state 520.

In state 520 the request cannot be satisfied with data currently stored in either cache1 or cache2, and so the request is passed to another device (e.g., a data server) where the data is located.

In state 522 the requested data are returned by the data server so that it can be cached and provided to the requesting user. Therefore, the data is stored in either cache1 or cache2 in state 524. Illustratively, the data is served in whichever of the caches was determined, under the guidelines, to have primary responsibility for the request. In one alternative embodiment of the invention, in place of or in addition to the guidelines historical information may be gathered and analyzed to determine in which cache the data received from the data server should be stored.

In state 526 the data is served to the user and the illustrated procedure ends.

FIGS. 5A–B describe just one procedure for operating a multi-tier caching system according to one embodiment of the invention. Other procedures may be derived from the preceding description of the invention. For example, instead of applying a set of guidelines to determine which cache should handle a request (based on which cache is more likely to store the requested data), in one alternative embodiment the caches operate in sequence. Thus, cache1 could receive the request, attempt to satisfy it and only pass it to cache2 if it does not store the requested data. In another alternative embodiment one or more caches may analyze, over time, the types of (or specific) requests that are received and the data that is served in response. A learning algorithm may be applied to cache the most frequently requested data in cache1 or to store in cache1 data that can be served to several different requests or different types of requests.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of responding to a data request in a computer system having multiple caches, the method comprising:
   receiving a first data request from a user;
   searching a first memory for a first data item responsive to said first data request, wherein the contents of said first memory are managed by an operating system;
   searching a second memory for said first data item, wherein the contents of said second memory are managed by an application program;
   if said searches of said first memory and said second memory are unsuccessful:
      receiving said first data item from a storage device other than said first memory and said second memory; and
      identifying one of said first memory and said second memory in which to store said first data item for serving in response to a later data request; and
      serving said first data item to said user;
   wherein said first data request comprises a parameter having a value, and wherein said identifying comprises storing said first data item in said second memory if a second data item different from said first data item must be served to a second data request having a different value for said parameter than said first data request.

2. The method of claim 1, wherein said identifying comprises storing said first data item in said first memory if said first data item is responsive to multiple different data requests.

3. The method of claim 1, further comprising transferring said first data item from one of said first memory and said second memory to the other of said first memory and said second memory.

4. The method of claim 3, wherein said first data item is transferred because of a characteristic of said first data item.

5. The method of claim 4, wherein said characteristic of said first data item is one of the set of: popularity, invalidity, size, type, and age.

6. The method of claim 1, further comprising prior to said serving, if one of said searches of said first memory and said second memory is successful:
   determining whether said first data item is invalid compared to a version of said first data item stored on a storage device other than said first memory and said second memory.

7. The method of claim 6, wherein said first data item is determined to be invalid; and
wherein said serving said first data item comprises serving said invalid first data item.

8. The method of claim 7, further comprising:
if said first data item is determined to be invalid, forwarding to said storage device a request for an updated version of said first data item.

9. The method of claim 7, further comprising prior to said serving:
if said first data item is determined to be invalid, determining whether a desired performance level of the computer system is maintainable if an updated version of said first data item is requested from said storage device to serve to said user in place of said invalid first data item.

10. The method of claim 9, wherein said determining whether a desired performance level of the computer system is maintainable comprises examining a characteristic of said first data item;
   wherein said characteristic is selected from a group including: popularity of said first data item, level of invalidity of said first data item, ages of said first data item, size of said first data item, type of said first data item, and cost of retrieving said first data item from said storage device.

11. The method of claim 9, wherein said determining whether a desired performance level of the computer system is maintainable comprises examining a performance characteristic of the computer system;
   wherein said performance characteristic is selected from a group including: desired response time for said first data request, number of user connections with the computer system, and a threshold number of data requests.

12. The method of claim 6, wherein said storage device is a computer server coupled to the computer system by a network link.

13. A method of responding to a data request in a computer system having multiple caches, the method comprising:
   receiving a first data request;
   identifying a relative level of processing that may be necessary, for said first data request, to identify a data item to be served in response to said data request;
   if said level of processing is relatively low, searching a first memory of the computer system for said data item, wherein contents of said first memory are managed by an operating system; and
   if said level of processing is relatively high, searching a second memory of the computer system for said data item, wherein contents of said second memory are managed by an application programs
   determining whether a cached version of said data item stored in one of said first memory and said second memory is invalid compared to a version of said data item stored on a storage device other than said first memory and said second memory; and
   if said cached version of said data item is determined to be invalid, determining whether a desired performance level is maintainable if an updated version of said data item is retrieved from said storage device for service and said first data request is held to await said updated version.

14. The method of claim 8, further comprising:
   receiving said data item from a data storage device;
   serving said data item in response to said first data request; and identifying one of said first memory and said second memory in which to store said data item.

15. The method of claim 14, in which said identifying comprises determining a relative frequency with which said data item may be served in response to later data requests.

16. The method of claim 14, in which said identifying comprises determining whether said data item may be served in response to a second data request different from said first data request.

17. The method of claim 13, wherein said first memory comprises a portion of memory of the computer system allocated to said operating system and said second memory comprises a portion of said computer system memory allocated to said application program.

18. The method of claim 13, further comprising:
serving said invalid cached version of said data item in response to said first data request.

19. The method of claim 13, further comprising:
requesting an updated version of said data item from said storage device.

20. A method of caching data in a multi-tier caching system, comprising:
receiving a first data request at a computer system having a memory;
searching a first memory for a data item responsive to said first data request, wherein said first memory comprises a portion of the computer system memory configured to store contents managed by an operating system;
searching a second memory for said data item, wherein said second memory comprises a portion of the computer system memory configured to store contents managed by an application program;
receiving a second data request;
serving, in response to said second data request, an invalid version of said data item from one of said first memory and said second memory:
receiving said data item from a storage device other than said first memory and said second memory;
serving said data item in response to said first data request; and
storing said data item in one of said first memory and said second memory.

21. The method of claim 20, wherein said storing comprises determining whether to store said data item in said first memory or said second memory based on a characteristic of said data item.

22. The method of claim 21, wherein said characteristic is one of the set of: popularity of said data item, size of said data item, age of said data item, invalidity of said data item and type of said data item.

23. The method of claim 20, wherein said storing comprises determining whether to store said data item in said first memory or said second memory based on a level of processing of said first data request required to identify said data item.

24. The method of claim 20, wherein said storing comprises determining whether to store said data item in said first memory or said second memory based on whether said data item is responsive to a data request different from said first data request.

25. The method of claim 20, further comprising copying said data item from one of said first memory and said second memory to the other of said first memory and said second memory due to a characteristic of said data item.

26. The method of claim 20, wherein said serving an invalid version of said data item comprises:
determining whether a desired performance level is maintainable if said second data request is held to await an updated version of said data item;
wherein said receiving said data item from a storage device comprises receiving said updated version of said data item.

27. A computer readable storage medium storing instructions that, when executed by a computer, cause the computer to perform a method of caching data in a multi-tier caching system, the method comprising:
receiving a first data request at a computer system having a memory;
searching a first memory for a data item responsive to said first data request, wherein said first memory comprises a portion of the computer system memory configured to store contents managed by an operating system;
searching a second memory for said data item, wherein said second memory comprises a portion of the computer system memory configured to store contents managed by an application program;
receiving a second data request:
serving, in response to said second data request, an invalid version of said data item from one of said first memory and said second memory,
receiving said data item from a storage device other than said first memory and said second memory;
serving said data item in response to said first data request; and
storing said data item in one of said first memory and said second memory.

28. The computer readable storage medium of claim 27, wherein said storing comprises determining whether to store said data item in said first memory or said second memory based on a characteristic of said data item.

29. The computer readable storage medium of claim 27, wherein said storing comprises determining whether to store said data item in said first memory or said second memory based on a level of processing of said first data request required to identify said data item.

30. The computer readable storage medium of claim 27, wherein said storing comprises determining whether to store said data item in said first memory or said second memory based on whether said data item is responsive to a data request different from said first data request.

31. A multi-tier caching system for a computing device having a main memory, the caching system comprising:
a first memory of the computing device, wherein contents of said first memory are managed by an operating system;
a second memory of the computing device, wherein contents of said second memory are managed by an application; and
a data analysis module configured to determine, for a first data item retrieved in response to a first data request, in which of said first memory and said second memory said first data item should be stored.

32. The multi-tier caching system of claim 31, wherein said data analysis module makes said determination based on a level of processing required to identify said first data item from said first data request.

33. The multi-tier caching system of claim 31, wherein said data analysis module makes said determination based on a characteristic of said first data item.

34. The multi-tier caching system of claim 31, further comprising:
an invalidation determination module configured to determine whether a second data item, stored in one of said first memory and said second memory, is invalid.

35. The multi-tier caching system of claim 34, wherein said second data item is determined to be invalid if an updated version of said second data item is available on a storage device coupled to the computing device.

36. The multi-tier caching system of claim 35, wherein said second data item is determined to be invalid and said invalid second data item is served in response to a second data request.

37. The multi-tier caching system of claim 34, wherein said second data item is invalid, further comprising:
a performance determination module configured to determine, when a second data request is received to which said second data item is responsive, whether a response to said second data request can be delayed to await said updated version of said second data item for service in place of said invalid second data item without threatening a desired performance level of the caching system.

38. The multi-tier caching system of claim 31, wherein the main memory of the computing device comprises said first memory and said second memory.

39. A computer readable storage medium containing a data structure configured for serving data items in response to data requests, the data structure comprising:
a first cache configured to store a first data item that is readily identifiable as being responsive to a first data request, wherein said first cache comprises a portion of the computer readable storage medium configured to store contents managed by an operating system; and
a second cache configured to store a second data item that is identifiable, after said second data request is analyzed, as being responsive to a second data request, wherein said second cache comprises a portion of the computer readable storage medium configured to be managed by an application program.

40. A method of operating a multi-tiered caching system in a single computer system, comprising:
receiving a first data request at a computer system having a multi-tiered caching system comprising multiple caches;
searching a first cache of the multiple caches for a data item responsive to said first data request, wherein contents of said first cache are managed by an operating system of the computer system; and
if said searching of said first cache is unsuccessful, passing said first data request to a second cache of the multiple caches managed by an application program executing on the computer system.

41. The method of claim 40, further comprising:
if a data item responsive to said first data request is not found in either of said first cache and said second cache, retrieving a responsive data item from a storage unit coupled to the computer system;
serving said retrieved data item in response to said first data request; and
selecting one of said first cache and said second cache to store said retrieved data item in.

42. The method of claim 40, wherein said data item is found in one of said first cache and said second cache, the method further comprising:
determining whether said data item is invalid compared to a version of said data item stored in a storage device other than said first cache and said second cache.

43. The method of claim 42, wherein said data item is determined to be invalid, the method further comprising:
serving said invalid data item in response to said first data request.

44. The method of claim 42, further comprising:
if said data item is determined to be invalid, forwarding a request for an updated version of said data item from said storage device.

45. The method of claim 42, further comprising prior to said serving:
if said data item is determined to be invalid, determining whether a desired performance level of the multi-tiered computer system is maintainable if an updated version of said data item is requested from said storage device to serve in response to said first data request.

46. A multi-tier caching system, comprising:
a first caching means configured to cache a first set of data items for serving in response to data requests, wherein said first caching means comprises a portion of a computer memory managed by an operating system executing on the computer;
a second caching means configured to cache a second set of data items for serving in response to data requests, wherein said second caching means comprises a portion of the computer memory managed by an application program executing on the computer;
selection means configured to select one of said first caching means and said second caching means to cache a new data item retrieved from a storage device external to the computer; and
serving means configured to serve, from one of said first caching means and said second caching means, an invalid version of a first data item in response to a request for the first data item;
wherein a current version of the first data item is stored on the storage device.

47. The multi-tier caching system of claim 46, wherein said selection means is further configured to move a first data item cached in one of said first caching means and said second caching means to the other of said first caching means and said second caching means.

48. The multi-tier caching system of claim 46, wherein said selection means is configured to store, in said second caching means, a first data item for serving in response to a data request comprising a first parameter having a first value if a second data item, different from the first data item, is to be served in response to a data request comprising the first parameter having a second value different from the first value.

49. The multi-tier caching system of claim 46, further comprising a performance determination module configured to determine, if a requested first data item is invalid, whether a desired performance level of the computer system is maintainable if an updated version of the first data item is requested from the storage device to serve in place of the first data item.

50. A computer readable medium storing instructions that, when executed by a computer, cause the computer to perform a method of caching data in a multi-tier caching system, the method comprising:
receiving a first data request from a user;
searching a first memory for a first data item responsive to said first data request, wherein the contents of said first memory are managed by an operating system;

searching a second memory for said first data item, wherein the contents of said second memory are managed by an application program;

if said searches of said first memory and said second memory are unsuccessful:
receiving said first data item from a storage device other than said first memory and said second memory; and
identifying one of said first memory and said second memory in which to store said first data item for serving in response to a later data request; and serving said first data item to said user;

wherein said data request comprises a parameter having a value, and wherein said identifying comprises storing said first data item in said second memory if a second data item different from said first data item must be served to a second data request having a different value for said parameter than said first data request.

51. The computer readable medium of claim 50, wherein said identifying comprises storing said first data item in said first memory if said first data item is responsive to multiple different data requests.

52. The computer readable medium of claim 50, further comprising transferring said first data item from one of said first memory and said second memory to the other of said first memory and said second memory.

53. The computer readable medium of claim 50, further comprising prior to said serving, if one of searches of said first memory and said second memory is successful:
determining whether said first data item is invalid compared to a version of said first data item stored on a storage device other than said first memory and said second memory; and
if said first data item is determined to be invalid, determining whether a desired performance level of the computer system is maintainable if an updated version of said first data item is requested from said storage device to serve to said user in place of said invalid first data item.

54. A method of responding to a data request in a computer system having multiple caches, the method comprising:
receiving a first data request from a user;
searching a first memory for a first data item to be served in response to said first data request, wherein the contents of said first memory are managed by an operating system;
searching a second memory for said first data item, wherein the contents of said second memory are managed by an application program; and
if one or more of said searches of said first memory and said second memory is successful:
determining whether said first data item is invalid compared to a version of said first data item stored on a storage device other than said first memory and said second memory; and
if said first data item is determined to be invalid, determining whether a desired performance level of the computer system is maintainable if an updated version of said first data item is requested from said storage device to serve to said user in place of said invalid first data item; and serving said first data item to the user.

55. The method of claim 54, further comprising:
transferring said first data item from one of said first memory and said second memory to the other of said first memory and said second memory.

56. The method of claim 54, wherein if said first data item is determined to be invalid, said serving comprises serving said invalid first data item.

57. The method of claim 54, wherein said determining whether a desired performance level of the computer system is maintainable comprises examining a popularity of said first data item.

58. The method of claim 54, wherein said determining whether a desired performance level of the computer system is maintainable comprises examining a level of invalidity of said first data item.

59. The method of claim 54, wherein said determining whether a desired performance level of the computer system is maintainable comprises examining an age of said first data item.

60. The method of claim 54, wherein said determining whether a desired performance level of the computer system is maintainable comprises examining a size of said first data item.

61. The method of claim 54, wherein said determining whether a desired performance level of the computer system is maintainable comprises examining a type of said first data item.

62. The method of claim 54, wherein said determining whether a desired performance level of the computer system is maintainable comprises examining a cost of retrieving said first data item from said storage device.

63. The method of claim 54, wherein said determining whether a desired performance level of the computer system is maintainable comprises determining whether said first data item is relatively static or relatively dynamic.

64. The method of claim 54, wherein said determining whether a desired performance level of the computer system is maintainable comprises examining a desired response time for responding to said first data request.

65. The method of claim 54, wherein said determining whether a desired performance level of the computer system is maintainable comprises examining a number of user connections with the computer system.

66. The method of claim 54, wherein said determining whether a desired performance level of the computer system is maintainable comprises examining a maximum desirable number of data requests for the computer system.

67. A computer readable medium storing instructions that, when executed by a computer, cause the computer to perform a method of responding to a data request in a computer system having multiple caches, the method comprising:
receiving a first data request;
identifying a relative level of processing that may be necessary, for said first data request, to identify a data item to be served in response to said data request;
if said level of processing is relatively low, searching a first memory of the computer system for said data item, wherein contents of said first memory are managed by an operating system;
if said level of processing is relatively high, searching a second memory of the computer system for said data item, wherein contents of said second memory are managed by an application program;
determining whether a cached version of said data item stored in one of said first memory and said second memory is invalid compared to a version of said data item stored on a storage device other than said first memory and said second memory; and
if said cached version of said data item is determined to be invalid, determining whether a desired performance level is maintainable if an updated version of said data item is retrieved from said storage device for service and said first data request is held to await said updated version.

68. The computer readable medium of claim 67, wherein said identifying comprises determining a relative frequency with which said data item may be served in response to later data requests.

69. The computer readable medium of claim 67, wherein said identifying comprises determining whether said data item may be served in response to a second data request different from said first data request.

70. The computer readable medium of claim 67, further comprising:

serving said invalid cached version of said data item in response to said first data request.

71. A computer readable medium storing instructions that, when executed by a computer, cause the computer to perform a method of operating a multi-tiered caching system in a single computer system, comprising:

receiving a first data request at a computer system having a multi-tiered caching system comprising multiple caches;

searching a first cache of the multiple caches for a data item responsive to said first data request, wherein contents of said first cache are managed by an operating system of the computer system; and if said searching of said first cache is unsuccessful, passing said first data request to a second cache of the multiple caches managed by an application program executing on the computer system.

72. A computer readable medium storing instructions that, when executed by a computer, cause the computer to perform a method of responding to a data request in a computer system having multiple caches, the method comprising:

receiving a first data request from a user;

searching a first memory for a first data item to be served in response to said first data request, wherein the contents of said first memory are managed by an operating system;

searching a second memory for said first data item, wherein the contents of said second memory are managed by an application program; and if one or more of said searches of said first memory and said second memory is successful:

determining whether said first data item is invalid compared to a version of said first data item stored on a storage device other than said first memory and said second memory; and if said first data item is determined to invalid, determining whether a desired performance level of the computer system is maintainable if an updated version of said first data item is requested from said storage device to serve to said user in place of said invalid first data item; and serving said first data item to the user.

* * * * *

UNITED STATES PATENT AND TRADEMARK OFFICE
CERTIFICATE OF CORRECTION

PATENT NO. : 6,732,237 B1
DATED : May 4, 2004
INVENTOR(S) : Jacobs et al.

It is certified that error appears in the above-identified patent and that said Letters Patent is hereby corrected as shown below:

Column 1,
Line 6, replace "entitled" with -- which is entitled --.

Column 18,
Lines 3 and 7, replace "The method of claim 7" with -- the method of claim 6 --.
Line 47, delete "and"
Line 51, replace "programs" with -- program; --.
Line 64, replace "The method of claim 8" with -- The method of claim 13 --.

Column 26,
Line 22, replace "to invalid" with -- to be in valid --.

Signed and Sealed this

Third Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,732,237 B1                                         Page 1 of 1
DATED         : May 4, 2004
INVENTOR(S)   : Jacobs et al.

It is certified that error appears in the above-identified patent and that said Letters Patent is hereby corrected as shown below:

Column 26,
Line 22, replace "to be in valid" with -- to be invalid --.

Signed and Sealed this

Twenty-eighth Day of September, 2004

JON W. DUDAS
*Director of the United States Patent and Trademark Office*